US011909178B2

(12) United States Patent
Niessner et al.

(10) Patent No.: US 11,909,178 B2
(45) Date of Patent: Feb. 20, 2024

(54) PRECHAMBER SPARK PLUG WITH THERMALLY ENHANCED PRECHAMBER CAP

(71) Applicant: FEDERAL-MOGUL IGNITION GMBH, Neuhaus-Schierschnitz (DE)

(72) Inventors: Werner Niessner, Steinheim (DE); Peter Janas-Habu, Duisburg (DE); Michael A. Golin, Dexter, MI (US)

(73) Assignee: FEDERAL-MOGUL IGNITION GMBH, Neuhaus-Schierschnitz (DE)

( * ) Notice: Subject to any disclaimer, the term of this patent is extended or adjusted under 35 U.S.C. 154(b) by 190 days.

(21) Appl. No.: 17/686,010

(22) Filed: Mar. 3, 2022

(65) Prior Publication Data
US 2022/0285920 A1    Sep. 8, 2022

Related U.S. Application Data

(60) Provisional application No. 63/156,772, filed on Mar. 4, 2021.

(51) Int. Cl.
*H01T 13/16* (2006.01)
*H01T 13/54* (2006.01)
*H01T 21/02* (2006.01)

(52) U.S. Cl.
CPC .............. *H01T 13/16* (2013.01); *H01T 13/54* (2013.01); *H01T 21/02* (2013.01)

(58) Field of Classification Search
CPC ......... H01T 13/16; H01T 13/54; H01T 21/02; H01T 13/41; H01T 13/32; H01T 13/06; Y02T 10/12
See application file for complete search history.

(56) References Cited

U.S. PATENT DOCUMENTS

| 4,452,189 A | 6/1984 | Latsch et al. |
| 7,210,447 B2 | 5/2007 | Robinet et al. |

(Continued)

FOREIGN PATENT DOCUMENTS

| DE | 102018221429 A1 | 6/2020 |
| FR | 1216885 A | 4/1960 |

(Continued)

*Primary Examiner* — Kevin Quarterman
(74) *Attorney, Agent, or Firm* — REISING ETHINGTON P.C.

(57) ABSTRACT

A prechamber spark plug having a thermally enhanced prechamber cap with a thermally conductive core, such as one made from a copper-, aluminum- and/or silver-based material. Due to its location and function, a prechamber cap is exposed to thermal energy from a pre-combustion process taking place within a prechamber, as well as thermal energy from a combustion process taking place in a main combustion chamber. Thus, the prechamber cap is being heated on both its interior and its exterior and, if not sufficiently cooled, can become so hot that it undesirably triggers preignition events in the engine. The thermally enhanced prechamber cap may include a main body with an interior surface and an exterior surface, a thermally conductive core with one or more thermal segments and insert segments, and one or more openings extending between a prechamber and a main combustion chamber, where each opening extends through an insert segment that is designed to resistant to corrosion and/or erosion.

18 Claims, 7 Drawing Sheets

(56) References Cited

U.S. PATENT DOCUMENTS

| | | |
|---|---|---|
| 8,912,716 B2 | 12/2014 | Hwang et al. |
| 9,010,292 B2 | 4/2015 | Herden |
| 9,441,528 B2 | 9/2016 | Pierz |
| 2016/0237879 A1 | 8/2016 | Rowan |
| 2019/0271262 A1 | 9/2019 | Leroux et al. |
| 2020/0165962 A1 | 5/2020 | Takada |
| 2023/0093289 A1* | 3/2023 | Drees ................. H01T 13/54 |
| | | 313/118 |
| 2023/0235695 A1* | 7/2023 | Blankmeister ........ F02B 23/104 |
| | | 123/253 |
| 2023/0318264 A1* | 10/2023 | Kaske ................. H01T 13/32 |
| | | 313/141 |

FOREIGN PATENT DOCUMENTS

| | | |
|---|---|---|
| JP | 2007100612 A | 4/2007 |
| JP | 2007138909 A | 6/2007 |
| WO | WO2018087418 A1 | 5/2018 |

\* cited by examiner

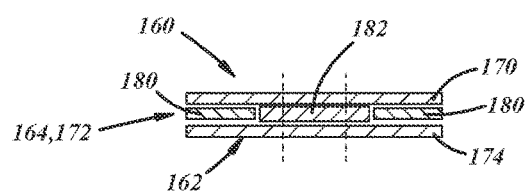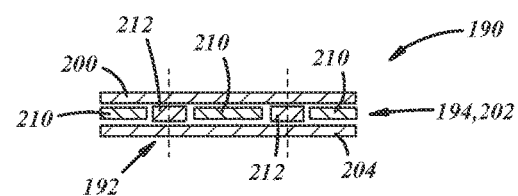
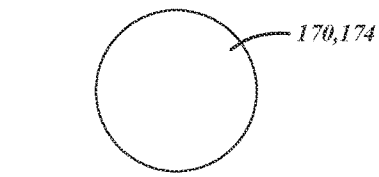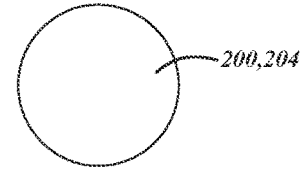
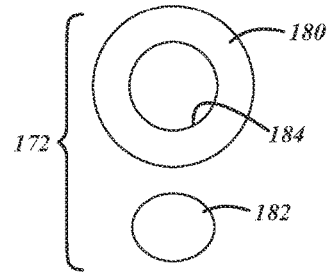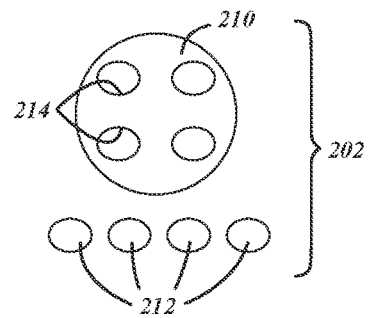
FIG. 7  FIG. 8

PRECHAMBER SPARK PLUG WITH THERMALLY ENHANCED PRECHAMBER CAP

RELATED APPLICATIONS

This application claims the benefit of U.S. Provisional Application No. 63/156,772, filed Mar. 4, 2021, the entire contents of which are herein incorporated by reference.

FIELD

The present disclosure generally relates to spark plugs and other ignition devices for use with various types of engines and, in particular, to prechamber spark plugs having thermally enhanced prechamber caps.

BACKGROUND

Prechamber spark plugs are exposed to high temperatures when in use in internal combustion engines. The thermal impact or load takes place on an external surface of a prechamber cap due to heat from the main combustion chamber, as well as on an internal surface of the prechamber cap due to heat from within the prechamber itself. Thus, the prechamber cap is heated on both internal and external surfaces. If the prechamber cap is not properly cooled, this component can overheat and potentially trigger preignition, such as the case with a glow ignition exciter.

SUMMARY

According to one embodiment, there is provided a prechamber spark plug, comprising: a center electrode assembly having a center electrode; an insulator having an axial bore for at least partially accommodating the center electrode assembly; a shell having an axial bore for at least partially accommodating the insulator; a ground electrode opposing the center electrode across a spark gap; and a thermally enhanced prechamber cap forming a prechamber that at least partially surrounds the spark gap, wherein the thermally enhanced prechamber cap includes a main body, a thermally conductive core, and at least one opening that allows the prechamber to communicate with a main combustion chamber; the main body includes a plurality of layers that correspond to interior and exterior surfaces of the thermally enhanced prechamber cap; and the thermally conductive core is sandwiched between the plurality of layers of the main body and includes a layer with at least one thermal segment and at least one insert segment, wherein the thermal segment includes at least one cutout in which the insert segment is located, and the insert segment is arranged such that the opening in the thermally enhanced prechamber cap extends through the insert segment.

According to various embodiments, the prechamber spark plug may further include any one of the following features or any technically-feasible combination of some or all of these features:
the thermally enhanced prechamber cap is dome-shaped, semispherical-shaped or semiovoid-shaped;
the thermally enhanced prechamber cap includes an end surface that is attached to an end surface of the shell, the end surfaces of both the thermally enhanced prechamber cap and the shell are angled or slanted annular surfaces that are welded together;
the thermally enhanced prechamber cap includes an end surface that is attached to an end surface of the shell, the end surfaces of both the thermally enhanced prechamber cap and the shell are flat annular surfaces that are welded together;
each of the plurality of layers of the main body is made from a nickel-based material;
the thermal segment is made from at least one of a copper-based material, an aluminum-based material, or a silver-based material;
the thermal segment is made from the copper-based material;
the thermally conductive core circumferentially extends within the main body and includes a first core end that is located at an end surface of the thermally enhanced prechamber cap;
the first core end is exposed at the end surface so that the thermal segment physically contacts an end surface of the shell when the thermally enhanced prechamber cap is attached to the shell;
the insert segment is arranged in the cutout of the thermal segment so that passage surfaces in the thermally enhanced prechamber cap that define the opening are made from a material of the insert segment and not a material of the thermal segment;
the thermally conductive core is shifted within the main body so that a distance $A_1$ is less than or greater than a distance $A_2$, where $A_1$ is a distance from an inner side of the conductive core to the interior surface of the main body, and $A_2$ is a distance from an outer side of the conductive core to the exterior surface of the main body;
the dimension $A_1$ is in a range from 0.1 mm to 0.5 mm, inclusive, and the dimension $A_2$ is in a range from 0.1 mm to 0.5 mm, inclusive;
the thermally enhanced prechamber cap is made from a multi-piece assembly that includes a roll clad strip with a first layer, a second layer, and a third layer, the second layer is sandwiched between the first and third layers and includes the insert segment and the thermal segment, when the multi-piece assembly is formed into the thermally enhanced prechamber cap, the first and third layers are formed into the main body and the second layer is formed into the thermally conductive core;
the insert segment of the second layer is provided in the shape of a circle or an oval and the thermal segment of the second layer is provided in the shape of a ring or annulus, and the thermal segment surrounds the insert segment;
the insert segment of the second layer is one of a plurality of insert segments and the thermal segment of the second layer is provided with a plurality of cutouts in its interior, and the thermal segment surrounds the plurality of insert segments;
the thermally enhanced prechamber cap is made from a multi-piece assembly that includes a first preformed cup, a second preformed cup or sleeve, and a third preformed cup, the second preformed cup or sleeve is sandwiched between the first and third preformed cups and includes the at least one insert segment and the at least one thermal segment, when the multi-piece assembly is formed into the thermally enhanced prechamber cap, the first and third preformed cups are formed into the plurality of layers of the main body and the second preformed cup or sleeve is formed into the thermally conductive core;
the at least one insert segment of the second preformed cup or sleeve is provided as an elongated insert and the at least one thermal segment of the second preformed cup or sleeve is provided with at least one open-ended cutout for receiving the elongated insert so that the thermal segment only partially surrounds the insert segment;

According to another embodiment, there is provided a method for manufacturing a thermally enhanced prechamber cap for a prechamber spark plug, the method comprising the steps of: providing a multi-piece assembly that includes a main body piece and a thermally conductive core piece; forming the multi-piece assembly into the thermally enhanced prechamber cap, wherein the main body piece is formed into a main body and the thermally conductive core piece is formed into a thermally conductive core, the main body includes a plurality of layers that correspond to interior and exterior surfaces of the thermally enhanced prechamber cap; the thermally conductive core is sandwiched between the plurality of layers of the main body and includes a layer with at least one thermal segment and at least one insert segment, wherein the thermal segment includes at least one cutout in which the insert segment is located; and forming at least one opening in the thermally enhanced prechamber cap so as to allow for communication between a prechamber and a main combustion chamber, wherein the insert segment is aligned with the opening such that the opening extends through the insert segment.

DRAWINGS

FIG. 7 is a view of an example of a multi-piece assembly that could be used with the manufacturing method of FIG. 6;

FIG. 8 is a view of another example of a multi-piece assembly that could be used with the manufacturing method of FIG. 6;

DESCRIPTION

The prechamber spark plug disclosed herein includes a thermally enhanced prechamber cap with a thermally conductive core, such as one made from a copper-, aluminum- and/or silver-based material. Due to its location and function, a prechamber cap is exposed to a significant degree of thermal input when the prechamber spark plug is in operation. For example, the interior of a prechamber cap is exposed to the thermal energy or heat associated with the pre-combustion process taking place in the prechamber, whereas the exterior of a prechamber cap is exposed to the thermal energy associated with the combustion process taking place in the main combustion chamber. Thus, the prechamber cap is being heated on both its interior and its exterior, which can significantly increase the temperature of that component. If the prechamber cap is not sufficiently cooled, it can become so hot that it undesirably triggers preignition events in the engine.

Figure 1:
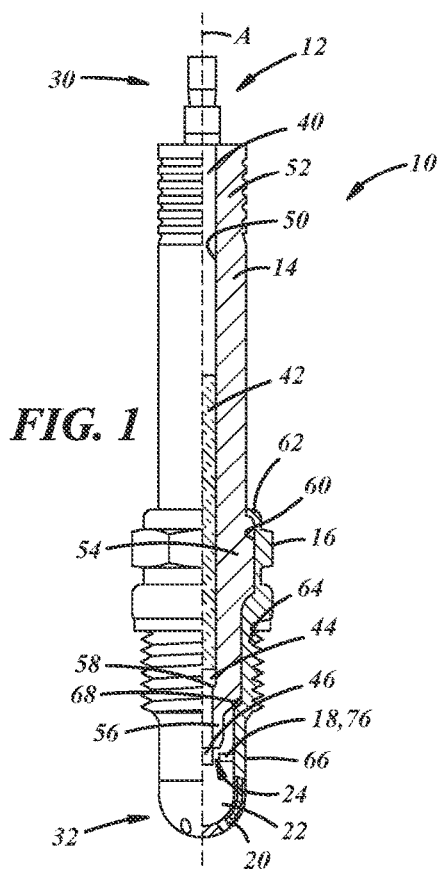
FIG. 1 is a cross-sectional view of an example of a prechamber spark plug with a thermally enhanced prechamber cap.

Referring to FIG. 1, there is shown an example of a prechamber spark plug with a thermally enhanced prechamber cap. Prechamber spark plug 10, also referred to as a prechamber plug or spark plug, includes a center electrode assembly 12, an insulator 14, a metallic shell 16, one or more ground electrodes 18, and a thermally enhanced prechamber cap 20 that forms a prechamber 22 and surrounds a spark gap 24. Generally speaking, the prechamber spark plug 10 extends from a terminal end 30 to a firing end 32 along a central or longitudinal axis A. It should be appreciated that the embodiment illustrated in FIG. 1 is simply a non-limiting example and that the thermally enhanced prechamber cap of the present application could be used with any number of other prechamber spark plugs, such as ones with one or more standard J-gap spark gap(s), aerial spark gap(s), surface discharge spark gap(s), semi-surface spark gap(s), annular ground electrode spark gap(s), multi-ground electrode spark gap(s), as well as ones with different prechamber sizes and shapes. It is also possible for the thermally enhanced prechamber cap to be used in embodiments where the prechamber is not totally enclosed, but instead is open at a lower axial end like a shielded skirt or sleeve. The thermally enhanced prechamber cap of the present application is not limited to a particular prechamber spark plug design or application.

Center electrode assembly 12, sometimes referred to as a center wire assembly, is located within an axial bore of the insulator and conducts an ignition pulse from an ignition system to the spark gap 24. According to a non-limiting embodiment, center electrode assembly 12 extends along the central axis A and includes a terminal electrode component 40, a seal 42, a center electrode component 44, as well as any other known center wire elements. Terminal electrode component 40 is designed to physically and electrically receive a boot from an ignition wire (not shown) at the terminal end 30 and to conduct a high voltage ignition pulse from the ignition wire to the seal 42. Seal 42 is an optional component that is typically located in the insulator bore between the terminal electrode component 40 and the center electrode component 44 and is designed to conduct the ignition pulse, while at the same time suppressing unwanted electromagnetic interference or noise that could impact other parts of the vehicle's electrical system. The seal 42 could be a glass seal, a conductive seal, a resistive seal, a suppressive seal, a fired-in seal, and/or a fusible seal, to cite a few possibilities, and it can be formed from powder, liquid or solid precursor materials. Center electrode component 44, sometimes referred to as a center electrode pin or simply a center electrode, is located towards the firing end 32 and is designed to conduct the ignition pulse to the spark gap 24, at which point a spark or arc will form across the spark gap to the ground electrode 18. According to one embodiment, center electrode component 44 includes an outer sheath made from a nickel-based material and an inner core made from a thermally conductive metal, such as a copper-based material. As understood in the art, center electrode component 44 may include a firing tip 46 made from a precious metal alloy like a platinum- or iridium-based material, although this is not necessary. The firing tip 46 may be a single- or multi-piece disc, rivet, column, bar, ring, sleeve or other shaped tip that includes a sparking surface exposed to the spark gap 24. It should be appreciated that the aforementioned components of the center electrode assembly 12, as shown in FIG. 1, are merely exemplary, as other suitable examples, embodiments, materials, sizes, shapes, combinations of components, etc. could be used instead.

Insulator 14 is disposed within an axial bore of the shell 16 and is constructed from a material, such as a ceramic material, that is sufficient to electrically insulate the center wire assembly 12 from the metallic shell 16. In one example, the insulator 16 is somewhat cylindrical and includes an axial bore 50, a terminal end section 52, a central section 54, and a firing end section 56 with an insulator nose or core nose component. The axial bore 50 extends from the terminal end section 52 towards the firing end section 56 along the central axis A of the prechamber spark plug and is designed to receive the center electrode assembly 12. At one or more locations along its axial extent, the axial bore 50 may include diametrically reduced interior shoulders 58 to receive and support complimentary features of the center electrode component 44. FIG. 1 only shows one interior shoulder in the axial bore 50, but this is not required, as the axial bore could have more or less of such features, as well as any other suitable features known in the art. Seals, gaskets and/or other sealing elements may be placed between the interior and exterior shoulders of the insulator and the center electrode component, and/or between the interior and exterior shoulders of the shell and the insulator. It should be appreciated that the aforementioned components of the insulator 14, as shown in FIG. 1, are merely exemplary, as other suitable examples, embodiments, materials, sizes, shapes, combinations of components, etc. could be used instead.

Shell 16, sometimes called a body, is constructed from a conductive material, such as steel or another metal alloy, and includes an axial bore 60, a locking section 62, a threaded section 64, and a firing end section 66. The axial bore 60 extends from the locking section 62 towards the firing end section 66 along the central axis A of the prechamber spark plug and is designed to receive the insulator 14. At one or more locations along its axial extent, the axial bore 60 may include diametrically reduced interior shoulders 68 to receive and support complimentary features of the insulator 14. Locking section 62 includes a diametrically-enlarged section that can be crimped, bent, swaged and/or otherwise shrank over top of an upper end of the central section 54 of the insulator so that the two components are securely attached to one another. The locking section 62 may also include a hex or other feature that enables the spark plug to be engaged by a wrench or other tool for installation and/or removal of the spark plug from a cylinder head. The threaded section 64 may be connected to the locking section 62 and is designed to thread into a complementary threaded hole in the cylinder head. Although not mandatory, the threaded section 64 may have an outer diameter that corresponds to an M8, M10, M12, M14 or other size plug. The firing end section 66 may be connected to the threaded section 64 and is typically the portion of the shell that is located closest to the firing end 32. The firing end section 66 includes an end surface 70, which is the lower axial end of the shell 16 and is an annular surface to which the thermally enhanced prechamber cap 20 may be attached. In some embodiments, not shown, the end surface 70 is simply a flat annular surface such that it extends radially, with respect to the central axis A; in other embodiments, such as the one shown in FIG. 2, the end surface 70 is a slanted or angled annular surface such that it forms an acute angle θ with the radial direction. In the illustrated embodiment, end surface 70 is angled inwardly such that the angled annular surface opens to the interior of the prechamber 22 (i.e., the exterior portion 72 of end surface 70 extends beyond, in the direction of the central axis A, the interior portion 74 of the end surface). However, this is not required, as the end surface 70 could also be angled outwardly so that it opens to the exterior of the plug. The firing end section 66 may axially extend substantially beyond the bottom of the threaded section 64, thereby forming a skirt-like extension, or the firing end section 66 could terminate just beyond the bottom of the threaded section 64 such that it is very short. It should be appreciated that the aforementioned components of the shell 16, as shown in FIG. 1, are merely exemplary, as other suitable examples, embodiments, materials, sizes, shapes, combinations of components, etc. could be used instead.

Ground electrode 18 cooperates with the center electrode component 44 to form the spark gap 24, and may be provided according to any number of different configurations. For instance, the ground electrode 18 may be a straight bar or rod and attach to an interior surface of the shell 16 so that it projects radially inward, as illustrated, or it may be attached to an interior surface of the thermally enhanced prechamber cap 20 or at a junction between the shell and the cap, to cite a few possibilities. Instead of the arrangement shown in FIG. 1 where the ground electrode 18 is a straight component, it is possible for the ground electrode to be bent in a standard J-gap configuration, or to be arranged such that it forms a surface discharge spark gap, a semi-surface spark gap, an annular ground electrode spark gap, a multi-ground electrode spark gap, etc. Ground electrode 18 may include an outer sheath made from a nickel-based material and an inner core made from a thermally conductive metal, such as a copper-based material, or it may simply be made of a nickel-based material without a separate inner core. The ground electrode 18 may include a firing tip 76 made from a precious metal alloy like a platinum- or iridium-based material, although this is not necessary. Furthermore, the firing tip 76 may be a single- or multi-piece disc, rivet, column, bar, ring, sleeve or other shaped tip that includes a sparking surface exposed to the spark gap 24. It should be appreciated that ground electrode 18, as shown in FIG. 1, is merely exemplary, as other suitable examples, embodiments, materials, sizes, shapes, combinations of components, etc. could be used instead.

Figure 2:
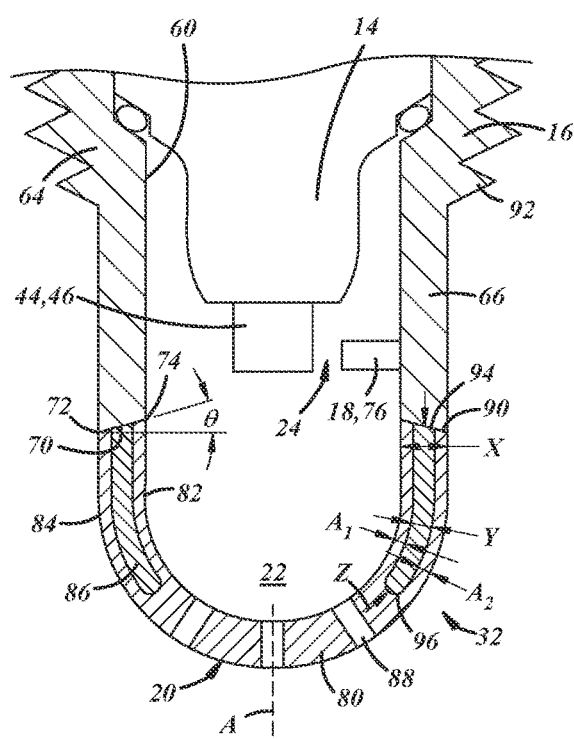
FIG. 2 is an enlarged cross-sectional view of the firing end of the prechamber spark plug from FIG. 1, with particular focus on the thermally enhanced prechamber cap.

Thermally enhanced prechamber cap 20 forms a separate prechamber 22 that at least partially surrounds or envelops the spark gap 24 and is in working communication with a main combustion chamber, not shown. The thermally enhanced prechamber cap 20, sometimes referred to as just the prechamber cap, includes a main body 80 with an interior surface 82 and an exterior surface 84, one or more thermally conductive cores 86, one or more openings 88, and an end surface 90 for attachment to the shell 16. In the example of FIG. 2, the thermally enhanced prechamber cap 20 is dome-shaped or semi-spherical and is welded to the end surface 70 of shell 16 so that the prechamber 22 is formed, however, the prechamber cap could have a semi-ovoid or other shape instead. The prechamber 22 is a space or volume that is defined by a combination of exterior surfaces of the insulator 14 and interior surfaces of the shell 16 and prechamber cap 20 and is in communication with a main combustion chamber via one or more openings 88 in the prechamber cap. At the open end of the thermally enhanced prechamber cap 20 (i.e., the end that is attached to the bottom of the shell), end surface 90 may be an angled or slanted annular surface, as shown in FIG. 2 and described above, or it may simply be a flat annular surface. In a different embodiment, the end surface 70 in the bottom of the shell could have an annular notch or groove and the end surface 90 in the prechamber cap could have a complementary annular rib or tenon so that the two components nest or fit together; the vice versa arrangement is possible also. The thermally enhanced prechamber cap 20 can be laser welded, resistance welded and/or otherwise attached to the shell such that a weldment is formed at the boundary or interface between end surfaces 70 and 90.

Main body 80 may be semi-spherical or dome-shaped so that it can attach to and at least partially enclose the open firing end section 66 of the shell and is preferably made from a nickel-based material, such as a high temperature nickel alloy like Inconnel 600 or 601. Of course, the main body 80 could have different shapes, sizes and/or compositions than those described herein. The interior surface 82 faces the prechamber or antechamber 22 such that it absorbs thermal energy associated with precombustion in the prechamber, whereas the exterior surface 84 faces a main combustion chamber, not shown, such that it receives thermal energy associated with combustion in the main chamber. The main body 80 may have a thickness X in a range from 0.6 mm to 2.0 mm, inclusive, or even more preferably from 0.8 mm to 1.5 mm, inclusive, such as about 1.0 mm. In the illustrated embodiment, the threads have a thread start 92 located on the threaded section 64 of the shell, but in another embodiment, it is possible for the threads to extend across the boundary between the shell 16 and the prechamber cap 20 such that the thread start is actually located on the exterior surface 84 of the prechamber cap. It is also possible for the interior surface 82 and/or the exterior surface 84 to include surface features, such as grooves, channels, stipples, etc., as such features can increase the area on the main body 80 that participates in heat transfer. For example, when fresh cooled gasses enter the prechamber 22, such gasses can interact with the surface features and help cool the prechamber cap 20.

Thermally conductive core 86 is located within the main body 80 and is designed to remove thermal energy or heat from the prechamber cap 20 so that thermal characteristics at the firing end 32 can be improved. The thermally conductive core 86 is embedded within the main body 80 and may be made from any suitable thermally conductive material, such as a copper-, aluminum- or silver-based material. In a preferred example, the thermally conductive core 86 is made from pure copper or a copper-based alloy having copper and one or more secondary constituents, like chromium and/or zirconium (e.g., a Cu—Cr—Zr alloy). The thermally conductive core 86 circumferentially extends around the prechamber cap 20 and may be in the shape of a cylinder that follows the three-dimensional contours of the main body 80 for a certain axial length as it extends from a first core end 94 to a second core end 96. In one example, such as the one shown in FIG. 2, the thermally conductive core 86 is in the shape of a tapered cylinder since the cylinder has a slightly larger diameter at the first core end 94 than it does at the second core end 96, thus, causing the conductive core to taper or funnel towards the second core end 96. In a different example, not shown, the thermally conductive core 86 may be in the shape of a standard or non-tapered cylinder that generally has a constant diameter along its axial length. Other configurations, such as ones where segments of the thermally conductive core 86 are located between openings 88 or where the thermally enhanced prechamber cap is a multilayer component with the thermally conductive core as a middle layer, are also possible. The first core end 94 is preferably exposed at the end surface 90 so that when the thermally enhanced prechamber cap 20 is attached to the end surface 70 of the shell, the first core end 94 will physically contact the end surface 70 in order to facilitate an efficient transfer of thermal energy across the barrier or interface between the prechamber cap 20 and the shell 16.

The thermally conductive core 86 may have a thickness Y in a range 0.3 mm to 1.6 mm, inclusive, or even more preferably from 0.4 mm to 0.6 mm, inclusive, such as about 0.5 mm. It is possible for the thermally conductive core 86 to be located within the center or middle of the thickness of the main body 80 so that dimensions $A_1$ and $A_2$, which refer to the distance from the inner side of the conductive core to interior surface 82 and the distance from the outer side of the conductive core to the exterior surface 84, respectively, are the same. It is also possible to tailor or customize the location of the thermally conductive core 86 within the main body 80 so that it more effectively absorbs heat from one surface than another. For instance, if the prechamber spark plug 10 is to be used in an application where the prechamber 22 is known to get very hot, the location of the thermally conductive core 86 may be slightly shifted within the main body 80 so that it is closer to the interior surface 82 of the prechamber cap than it is to the exterior surface 84; this would result in dimension $A_1$ being smaller than $A_2$ and would increase the effectiveness or ability of the thermally conductive core 86 to remove heat from the interior surface 82. Conversely, if the prechamber spark plug 10 is to be used in an application where the main combustion chamber of the engine is known to be excessively hot, the thermally conductive core 86 may be slightly shifted within the main body 80 so that it is closer to the exterior surface 84; this would cause dimension $A_2$ to be smaller than $A_1$ and would increase the ability of the conductive core to remove heat from the exterior surface 84. In the preceding examples, the thermally conductive core 86 is still encompassed within or surrounded by the main body 80, just not in its exact center or middle, so that the main body material can protect the more vulnerable conductive core material from corrosion, erosion, etc. According to a non-limiting example, the spacing $A_1$ between an inner side of the conductive core and the interior surface 82 is in a range from 0.1 mm to 0.5 mm, inclusive, or even more preferably from 0.2 mm to 0.3 mm, inclusive, and the spacing $A_2$ between an outer side of the conductive core and the exterior surface 84 is in a range from 0.1 mm to 0.5 mm, inclusive, or even more preferably from 0.2 mm to 0.3 mm, inclusive.

The thermally conductive core 86 may have an axial length Z, from the first core end 94 to the second core end 96, that is in a range from 1.0 mm to 6.0 mm, inclusive, or even more preferably from 1.0 mm to 4.0 mm, inclusive. As mentioned above, it is preferable that the first core end 94 be at the end surface 90 of the prechamber cap 20 so that an efficient transfer of thermal energy can occur across the boundary between the prechamber cap 20 and the shell 16. It is also preferable that the second core end 96 terminate short of the openings 88 so that the surfaces that actually define the opening passages are made from the main body 80 material and not from the conductive core 86 material. Skilled artisans will appreciate that the main body 80 material (e.g., a high temperature nickel-based material) is much more resistant to corrosion and erosion caused by flame jets shooting through the openings 88 than is the conductive core 86 material (e.g., a copper-based material). According to another example, the thermally conductive core can be a multi-layer core where an inner core component is embedded in an outer core component which, in turn, is embedded in the main body 80.

The thermally enhanced prechamber cap 20 is shown as being dome-shaped or semi-spherical and is welded to the end surface 70 of shell 16 so that the prechamber 22 is formed, however, the prechamber cap could have a semi-ovoid or other shape instead. The prechamber 22 is a space or volume that is defined by a combination of exterior surfaces of the insulator 14 and interior surfaces of the shell 16 and prechamber cap 20 and is in communication with a main combustion chamber via one or more openings 88 in the prechamber cap. At the open end of the thermally enhanced prechamber cap 20 (i.e., the end that is attached to the bottom of the shell), end surface 90 may be an angled or slanted annular surface, as shown in FIG. 2 and described above, or it may simply be a flat annular surface. In a different embodiment, the end surface 70 in the bottom of the shell could have an annular notch or groove and the end surface 90 in the prechamber cap could have a complementary annular rib or tenon so that the two components nest or fit together; the vice versa arrangement is possible also. The thermally enhanced prechamber cap 20 can be laser welded, resistance welded and/or otherwise attached to the shell such that a weldment is formed at the boundary or interface between end surfaces 70 and 90.

Figure 3:
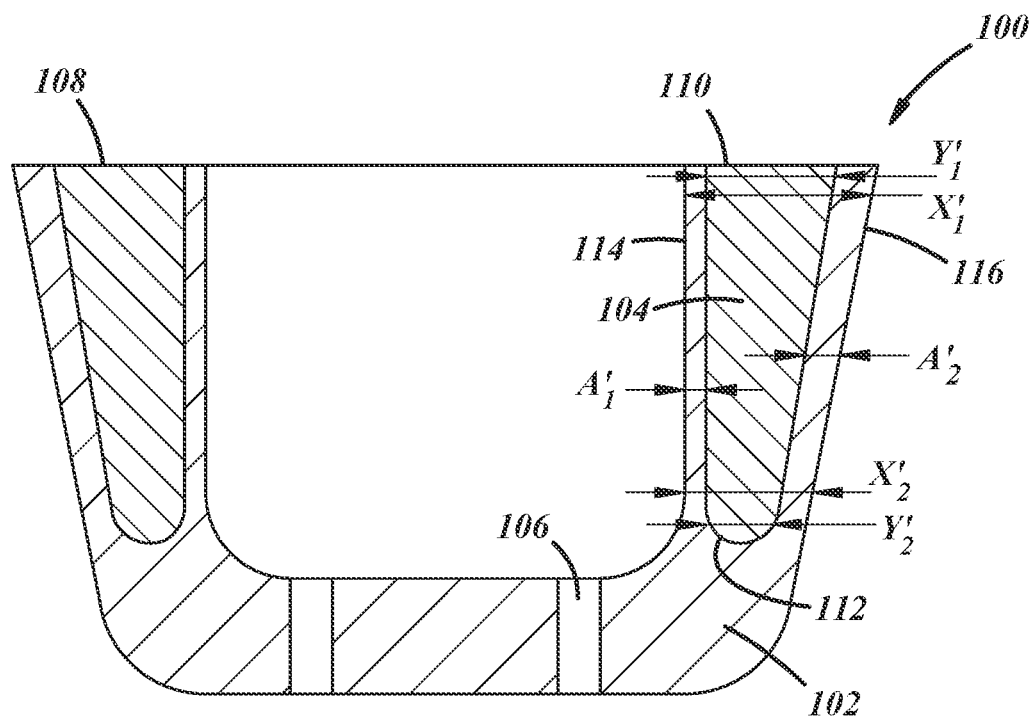
FIG. 3 is an enlarged cross-sectional view of another example of a firing end of a prechamber spark plug, where a thermally enhanced prechamber cap has an increased thickness at one end.

Turning now to FIG. 3, there is shown another example of a thermally enhanced prechamber cap 100 that includes a main body 102, a thermally conductive core 104, one or more openings 106, and an end surface 108 for attachment to the shell 16. Unless stated otherwise, thermally conductive prechamber cap 100 may have any suitable combination of the features and attributes described above in conjunction with prechamber cap 20. One difference with prechamber cap 100 is that the main body 102 and/or the thermally conductive core 104 is flared out or expanded towards the end surface 108 so that it is thickest near the portion of the prechamber cap that attaches to the shell 16. As illustrated in FIG. 3, the main body 102, which is preferably made from a nickel-based material, has a thickness that is flared or tapered so that it varies along its axial length; in this case, the thickness is greatest near the end surface 108 (dimension $X_1'$) and decreases as one moves axially away from that surface (dimension $X_2'$). The thermally conductive core 104, which is preferably made from a copper-, aluminum- or silver-based material with good thermal conductivity, may also have a tapering thickness or width so that the thickness at a first core end 110 of the conductive core (dimension $Y_1'$), which is preferably located at the end surface 108, is greater than the thickness towards a second core end 112 (dimension $Y_2'$). If one were to view the thermally conductive core 104 by itself in three dimensions, it would appear to be a tapered cylinder or sleeve with a constant inner diameter and a varying outer diameter. In this particular example, both the main body 102 and the thermally conductive core 104 have tapering or non-uniform thicknesses along their axial extent, however, that is not required. It is possible instead for the main body 102 to have a tapering thickness that is greatest towards the end surface 108 while the thermally conductive core 104 has a constant thickness, or for the thermally conductive core 104 to have a tapering thickness that is greatest towards the end surface 108 and the main body 102 to have a thickness that is constant.

In the illustrated embodiment, the thermally conductive core 104 is slightly offset within the main body 102 in favor of an interior surface 114 of the prechamber cap so that the dimension $A_1'$ is slightly smaller than the dimension $A_2'$. In other embodiments, the thermally conductive core 104 could be shifted within the main body 102 in favor of a prechamber cap exterior surface 116 so that dimension $A_1'$ is slightly larger than the dimension $A_2'$, or its possible for the thermally conductive core 104 to be centered within the main body 102 so that dimensions $A_1'$ and $A_2'$ are approximately the same. As mentioned above, the relative location of the thermally conductive core 104 within the main body 102 may be determined or influenced by the expected amounts of heat produced in the prechamber versus the main combustion chamber, thus, making the thermally enhanced prechamber cap customizable to the particular application in which it is to be used. Another potentially desirable attribute of the thermally enhanced prechamber cap 100 is the relatively large cross-sectional area of the thermally conductive core 104 at the first core end 110 or end surface 108, which is in physical contact with the end surface 70 of the shell. Such a large cross-sectional area can produce a thermally enhanced junction or interface between the prechamber cap and shell where improved thermal conductivity takes place. Other changes and features are certainly possible for prechamber cap 100.

Figure 4:
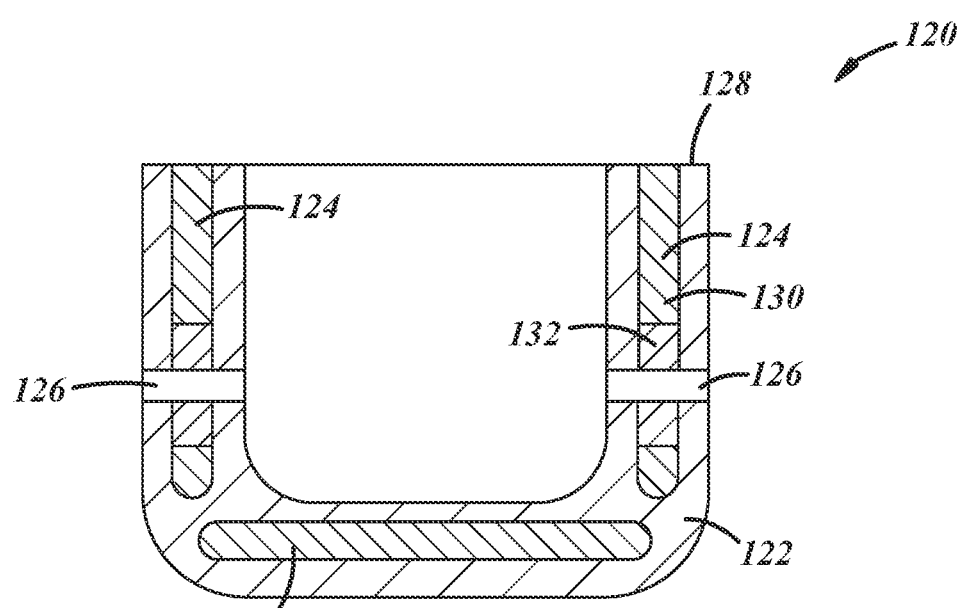
FIG. 4 is an enlarged cross-sectional view of yet another example of a firing end of a prechamber spark plug, where a thermally enhanced prechamber cap has a multi-piece thermally conductive core.

FIG. 4 shows another potential embodiment of a thermally enhanced prechamber cap 120 that includes a main body 122, several thermally conductive cores 124, 124', one or more openings 126, and an end surface 128 for attachment to the shell 16. Unless stated otherwise, thermally conductive prechamber cap 120 may have any suitable combination of the features and attributes described in conjunction with prechamber caps 20, 100. One difference with prechamber cap 120 is that at least one of the thermally conductive cores 124, 124' is a multi-piece core with a thermal segment 130 and one or more insert segments 132. The thermal segment 130, like the thermally conductive cores described above, is preferably made from a copper-, aluminum- or silver-based material and is designed to remove thermal energy away from the prechamber cap 120 and conduct it towards the shell 16 where it can be further dissipated. The insert segments 132 are preferably made from a nickel- or precious metal-based material that is more resistant to corrosion and/or erosion since the insert segments 132 are located at the openings 126 in the prechamber cap, through which flame jets shoot from the prechamber to the main combustion chamber. The insert segments 132 may act as protective linings for the openings 126 and help protect the passage surfaces therein from the flame jets. The thermal segment 130 may be shaped as a sleeve with circular or other shaped insert segments 132 (e.g., two, three or four insert segments; one per opening 126) embedded at different circumferential positions around the sleeve. The thermally conductive core 124', which is shown towards the axial bottom of the prechamber cap 120 opposite the end surface 128, may be a single-piece core (assuming that there are no openings 126 in that area), or it may be a multi-piece core like 124 (if there are openings 126 in that area). Thermally conductive cores 124, 124' are shown as separate pieces within main body 122, however, it is possible for them to be joined as a single core or to have some other configuration.

In operation, an air/fuel mixture is brought from the main combustion chamber into the prechamber 22 through the openings 88, 106, 126 in connection with a compression stroke. A spark at the spark gap 24 initiates a preignition event in the prechamber 22 which causes flame jets to shoot from the prechamber 22 to the main combustion chamber through the openings 88, 106, 126 in connection with a power stroke. A substantial amount of thermal energy is created both in the prechamber 22 and in the main combustion chamber, and some of that thermal energy is inputted to the thermally enhanced prechamber cap 20, 100, 120. Due to the heightened thermal conductivity of the thermally conductive core 86, 104, 124, the prechamber cap 20, 100, 120 is able to transfer or convey some of the thermal energy to the shell 16, from which it can be further dissipated in the cylinder head where there are cooling channels, etc. This, in turn, helps cool the prechamber cap 20, 100, 120 and avoid preignition events, which are undesirable.

Figures 5, 6:
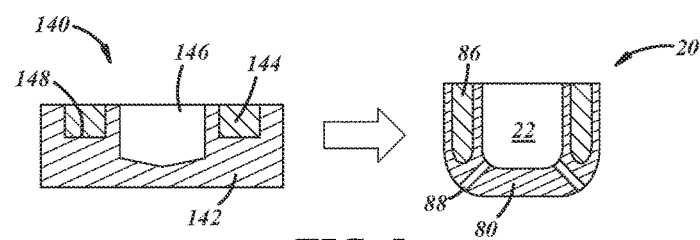
FIG. 5 is a cross-sectional view of an example of a manufacturing method that could be used to produce one or more of the thermally enhanced prechamber caps.
FIG. 6 is a cross-sectional view of another example of a manufacturing method that could be used to produce one or more of the thermally enhanced prechamber caps.
Figure 9:
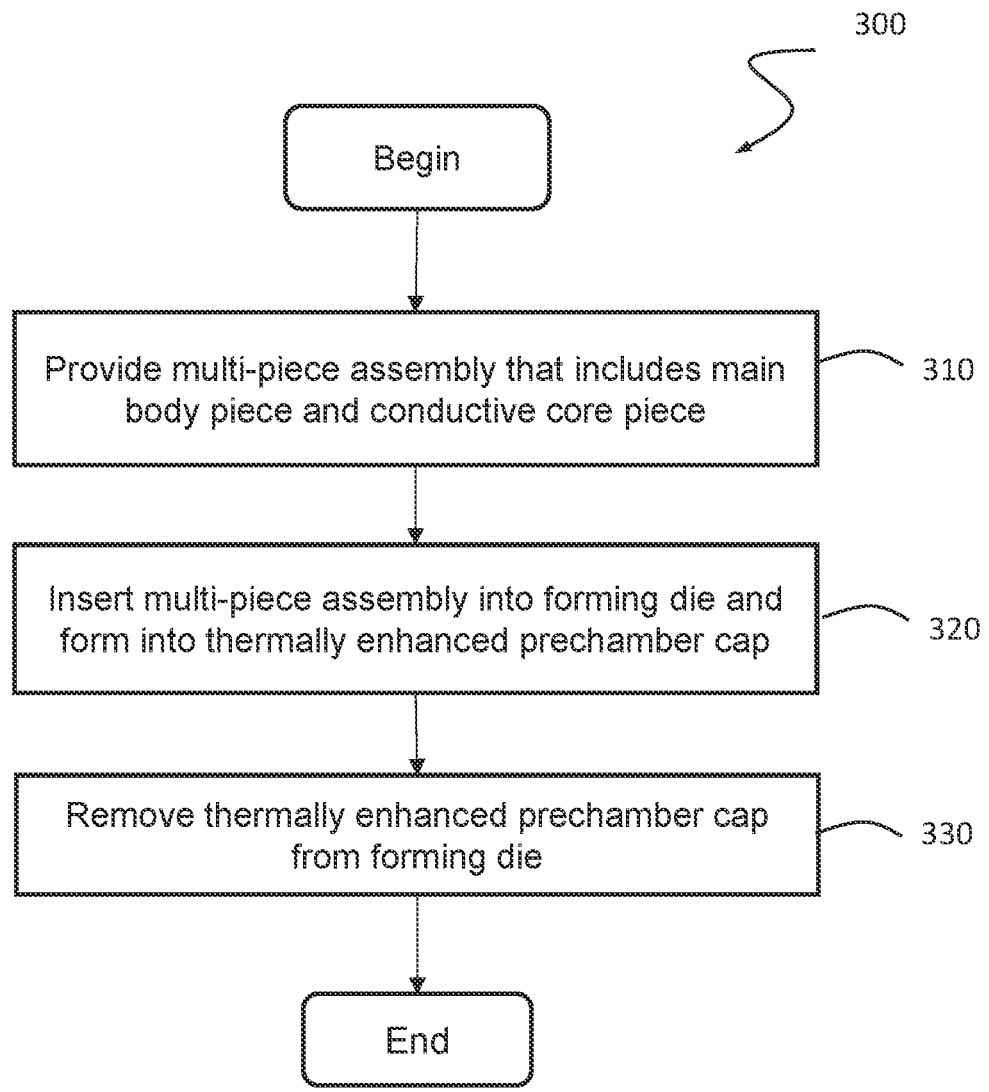
FIG. 9 is a flowchart illustrating a possible sequence of steps that may be used to carry out the manufacturing method of FIGS. 5-6.

In production, the thermally enhanced prechamber cap may be manufactured according to a number of different techniques. In a first example of method 300, which is illustrated in FIGS. 5 and 9 and could be used to produce one or more of the prechamber caps disclosed herein, a multi-piece assembly 140 is initially provided that includes a main body piece 142 and a thermally conductive core piece 144, step 310. The main body piece 142, which is preferably made from the nickel-based material described above, includes a blind hole 146 and an annular groove 148. The blind hole 146 will be enlarged and formed into the space that becomes part of the prechamber such that the interior surface of the blind hole 146 corresponds to the interior surface of the prechamber cap. The annular groove 148 is a circular- or ring-shaped groove or trench that circumferentially extends around the main body piece 142 and is sized to receive the thermally conductive core piece 144, which can simply be press fit or otherwise tightly inserted into the annular groove. The thermally conductive core piece 144 is preferably in the shape of a ring and will ultimately be formed into the thermally conductive core and, as such, is preferably made from the copper-, aluminum or silver-based material described above.

Next, the multi-piece assembly 140 is inserted into a forming die so that a ram or punch can be brought down and form the multi-piece assembly into the thermally enhanced prechamber cap, step 320. In the embodiment of FIG. 5, the punch first engages the multi-piece assembly 140 in the blind hole 146, and then it continues to drive the multi-piece assembly deeper into a die cavity so that an exterior surface of the drawn part takes the shape of the die cavity and an interior surface of the drawn part takes the shape of the punch. In the example of prechamber cap 20, the multi-piece assembly 140 is deep drawn or otherwise formed into the thermally enhanced prechamber cap 20 so that the main body piece 142 becomes the main body 80, the thermally conductive core piece 144 becomes the thermally conductive core 86, and the blind hole 146 becomes the prechamber or antechamber 22. In the example of prechamber cap 100, the die cavity and/or the multi-piece assembly 140 would be shaped so that when the main body piece 142 is formed into the main body 102 and the thermally conductive core piece 144 is turned into the thermally conductive core 104, the prechamber cap 100 would have a thickness that flares out or is expanded at the end surface 108. Forming step 320 can include a single forming step or cycle or a progressive sequence of forming steps or cycles, such as those employed with progressive dies, to cite a few possibilities.

Finally, the thermally enhanced prechamber cap is removed from the forming die so that it can be laser welded and/or otherwise attached to the end surface 70 of the shell 16. FIG. 5 shows a formed prechamber cap 20, but the method may be used to form any of the thermally enhanced prechamber caps described herein, as well as others, and is not limited to this particular example. It is possible that one or more pre-attachment conditioning steps, such as grinding or smoothing the end surface, are performed before the prechamber cap is actually attached to the shell 16. The openings in the prechamber cap, such as openings 88, may be drilled or otherwise formed before or after the prechamber cap attached to the shell 16.

Turning to FIGS. 6-9, another example of method 300 is shown for manufacturing a thermally enhanced prechamber cap. In this example, for step 310, a multi-piece assembly 160 is provided that includes a main body piece 162 and a thermally conductive core piece 164. However, instead of the main body piece having a thermally conductive core piece press-fit into an annular groove, as in the previous embodiment, the multi-piece assembly 160 can be provided as a roll clad strip, sometimes referred to as clad tape, that includes a first layer 170, a second layer 172 and a third layer 174 (best shown in FIG. 6). The main body piece 162 includes the first and third layers 170 and 174, which sandwich the second layer 172 in between and generally correspond to the interior and exterior surfaces of the prechamber cap, respectively, once that component is formed. It is preferable that the first and third layers 170 and 174 are made from the same nickel-based material mentioned above, as these layers will help form the main body of the finished prechamber cap. The second layer 172, on the other hand, may have several different segments, including one or more thermal segments 180 and one or more insert segments 182. As will now be explained, the second or middle layer of the multi-piece assembly may include different combinations and/or arrangements of components and is not limited to any particular embodiment.

According to a first embodiment of step 310, which is shown in FIG. 7, the second layer 172 includes an insert segment 182 that has a circular- or oval-shaped configuration and is preferably made from a nickel-based material, like the one mentioned above, and a thermal segment 180 that is provided in a ring- or annular-shaped configuration that surrounds the insert segment 182. The thermal segment 180 is preferably made from the aforementioned copper-, aluminum- or silver-based material. The insert segment 182 is sized and shaped to fit into a cutout 184 in the thermal segment 180. The embodiment of FIG. 7 is best suited for manufacturing a thermally enhanced prechamber cap that does not have a thermally conductive core at its axial bottom, opposite an end surface where the prechamber cap attaches to the shell. Non-limiting examples of such a thermally enhanced prechamber cap include prechamber caps 20 and 100 shown in FIGS. 2 and 3.

According to a second embodiment for step 310, which is illustrated in FIG. 8, a multi-piece assembly 190 includes a main body piece 192 and a thermally conductive core piece 194 and is provided as a clad tape having a first layer 200, a second layer 202, and a third layer 204, where the first and second layers are generally the same as the preceding embodiment but the second layer is somewhat different. The second layer 202 may include several different segments, including one or more thermal segments 210 and one or more insert segments 212. The thermal segment 210 may be circular, in terms of its exterior periphery, and may include a number of circular or other shaped cutouts 214 in its interior for receiving the insert segments 212. The insert segments 212 are sized and shaped to fit into the cutouts 214 in the thermal segment 210. As its name suggests, the thermal segment 210 is preferably made from a thermally conductive material, like a copper-, aluminum- or silver-based material, and is positioned within the multi-piece assembly 190 so that it can eventually act as a thermally conductive core once the prechamber cap is formed. Each of the insert segments 212 corresponds with an opening in the prechamber cap so that, when the prechamber cap is formed, the passage surfaces in the openings will be made from or at least lined with a more corrosion and/or erosion resistant material, such as a nickel- or precious metal-based material. Of course, other configurations and embodiments are certainly possible instead.

Turning back to FIG. 9, the method continues with the multi-piece assembly being inserted into a forming die and being formed into a thermally enhanced prechamber cap, step 320. A non-limiting example of this step is illustrated in FIG. 6, where the multi-piece assembly 160 is loaded in a forming die 250 so that a punch 252 can be lowered with a force F in order to deep draw the multi-piece assembly into a formed prechamber cap 20. After forming, the first layer 170 can extend over the entire interior surface 82 of the formed prechamber cap 20, the second layer 172 can occupy the center of the formed prechamber cap, and the third layer 174 can extend over the entire exterior surface 84 of the formed prechamber cap As with the previous embodiment, this forming step can include a single forming step or cycle or a progressive sequence of forming steps or cycles, such as those employed with progressive dies. It should be pointed out that it is not necessary for the first layer 170, the insert segment 182, and the third layer 174 to be made from the exact same material, as different materials, such as various nickel-based materials or other corrosion and/or erosion resistant materials, may be specifically selected for each item.

Next, in step 330, the thermally enhanced prechamber cap may be removed from the forming die and subjected to pre-attachment conditioning steps (this is optional), such as drilling or punching of the openings 88, etc. before being attached to the shell. It should be appreciated that the various thermally enhanced prechamber cap embodiments described herein are not limited to the aforementioned manufacturing methods. Other methods, including ones with different combinations and/or sequences of steps, may be used to produce such prechamber caps.

According to another example, the thermally enhanced prechamber cap is manufactured by first providing a main body piece in the shape of a flat, blanked component (e.g., a circular or oval shaped blank made of a nickel-based material), and then inserting the main body piece into a forming die so that a punch can be brought down and form the main body piece into a prechamber cap (this process is sometimes referred to as a cupping process). During the cupping process, an annular channel where the thermally conductive core is to go can be formed in the prechamber cap so that a cylindrical- or sleeve-shaped thermally conductive core, which is formed separately, can be press-fit or otherwise inserted into the annular channel. The thermally conductive core may or may not have a plurality of inserts or insert segments circumferentially located around the cylinder to line up with an opening in the prechamber cap, as described above. In a slightly different example, the thermally conductive core is inserted into the annular channel in the main body separately from the inserts, as opposed to the inserts being inserted as part of a combined subassembly. This manufacturing process differs from the previous ones in that the main body and thermally conductive core are formed separately and then added together at a later point of the assembly process, instead of being formed together in the forming die. Other manufacturing methods and techniques may certainly be used instead.

Figure 10:
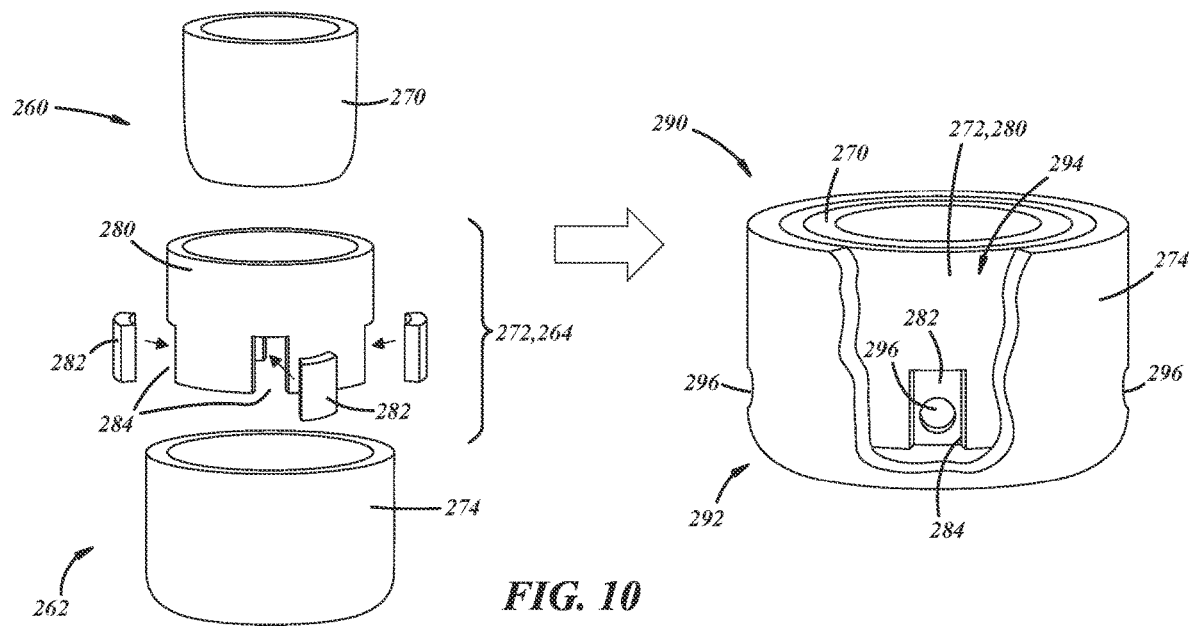
FIG. 10 is an exploded and cutaway view of yet another example of a manufacturing method that could be used to produce one or more of the thermally enhanced prechamber caps.
Figure 11:
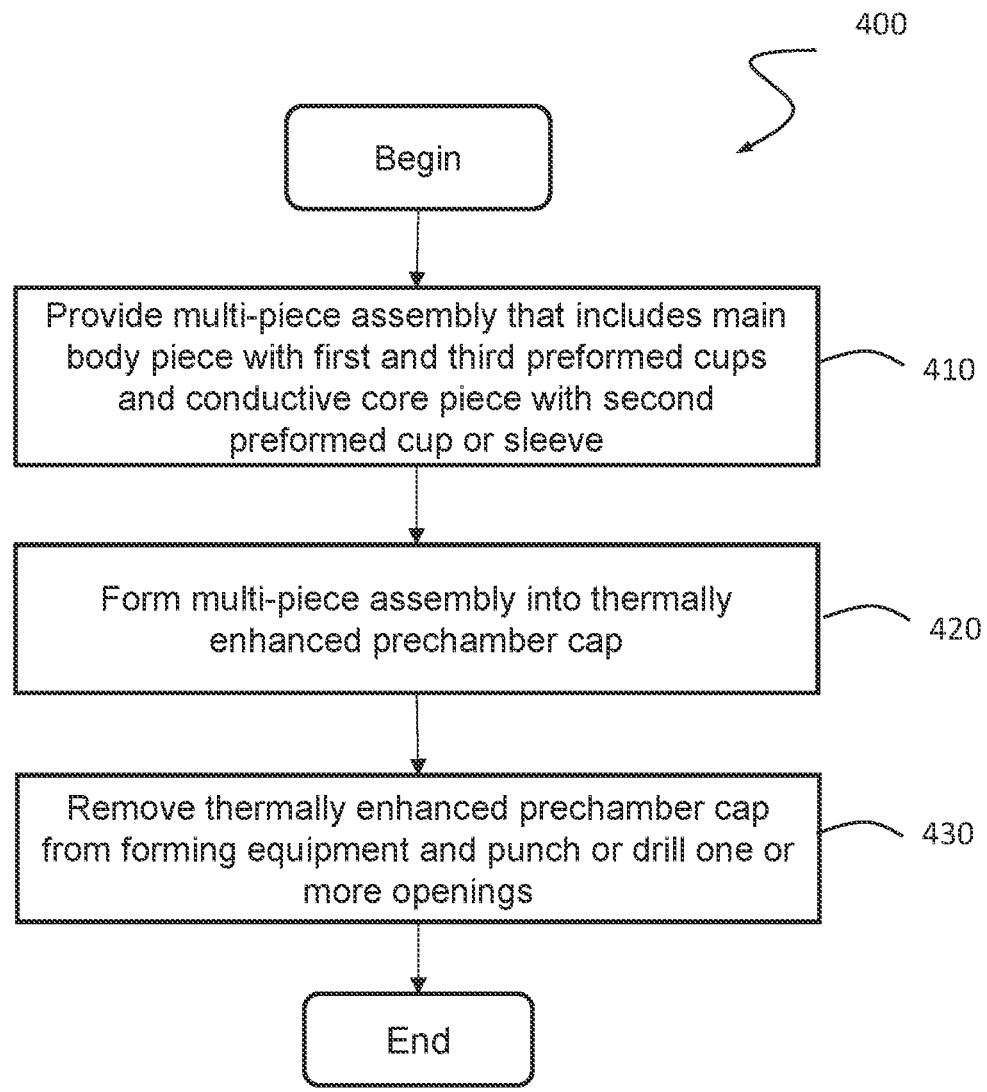
FIG. 11 is a flowchart illustrating a possible sequence of steps that may be used to carry out the manufacturing method of FIG. 10.

With reference to FIGS. 10-11, there is shown yet another example of a method 400 for manufacturing a thermally enhanced prechamber cap. In step 410, a multi-piece assembly 260 is provided that includes a first preformed cup 270, a second preformed cup or sleeve 272, and a third preformed cup 274. One potential benefit of separately providing the different preformed cups is that the size and/or shape of each cup can be optimized for forming, stamping, deep drawing, etc. The first and third preformed cups 270 and 274 make up a main body piece 262 and are preferably made from the same nickel-based material as described above. The second preformed cup or sleeve 272 is sandwiched between the first and second preformed cups 270 and 274 and constitutes a thermally conductive core piece 264. The second preformed cup or sleeve 272 includes a thermal segment 280 and one or more insert segments 282 that are sized and shaped to fit into one or more cutouts 284 in the thermal segment. According to the example illustrated in FIG. 10, the second preformed cup or sleeve 272 is a cylindrical sleeve having four cutouts 284 circumferentially spaced around a lower axial end of the sleeve (the lower axial end of the sleeve corresponds to the closed end of the prechamber cap that is opposite the end that attaches to the shell). The number, size and location of the cutouts 284 and the insert segments 282 correspond to the number, size and location of the openings that connect the prechamber to the main combustion chamber (there is one cutout/insert segment pair for each opening), for that is why the insert segments are provided. As explained above, by having each opening pass through an insert segment, which is made of a more robust material better able to withstand the corrosive and/or erosive effects of the hot combustion gases, as opposed to the more susceptible thermal segment, the prechamber cap is improved. It should be appreciated that the cutouts mentioned above do not actually have to be "cut" out of the thermal segment, as they could be stamped, blanked, punched, cut, drilled and/or otherwise formed.

Next, the multi-piece assembly 260 is formed into a thermally enhanced prechamber cap 290, step 420. Since the multi-piece assembly 260 already includes preformed cups 270-274 that are largely in the shape of the desired prechamber cap, step 420 may not need to deep draw or do much forming to substantially change the shape of the assembly, and instead may simply press, squeeze or work the final size and/or shape of the assembly so that the preformed cups become more intimately connected and/or joined to one another. This is an optional step, as it may suffice to simply stack and fit the various preformed cups 270-274 in one another. After the thermally enhanced prechamber cap 290 is formed, the first and third preformed cups 270 and 274 of the main body piece 262 become a main body 292 of the prechamber cap and correspond to interior and exterior surfaces, respectively. The second preformed cup or sleeve 272, following formation of the thermally enhanced prechamber cap, becomes a thermally conductive core 294 and acts as the main thermal pathway for conducting heat away from the prechamber cap and towards the shell.

In the non-limiting example of FIG. 10, both the insert segments 282 and the cutouts 284 are generally in the form of elongated rectangles. More specifically, the thermal segment 280 is provided as a sleeve that is open at both ends and the four cutouts 284 are evenly spaced around the sleeve at one of the open ends so that the cutouts are open-ended. This allows the insert segments 282 to be slid into the cutouts 284 during assembly. In a different example, the thermal segment 280 is provided as a cylinder that is closed at one axial end (i.e., a cup), as opposed to being a sleeve open at both axial ends. In yet another example, the cutouts are not open-ended (i.e., they are not a slot open on one or more sides), but rather they are closed cutouts, like cutouts 184, 214, that are completely surrounded by the thermal segment on all sides. Other sizes, shapes, numbers of cutouts and/or inserts could be used instead.

In step 430, the thermally enhanced prechamber cap may be removed from the forming equipment and subjected to pre-attachment conditioning steps, such as drilling or punching the openings 296, etc. before or after being attached to the shell. Each of the openings 296 in the prechamber cap extends through: the first preformed cup 270 which constitutes part of the main body and includes the interior surface of the prechamber cap, one of the insert segments 282 that is preferably made of a durable material like a nickel-based or precious metal-based material, and the third preformed cup 274 which constitutes part of the main body and includes the exterior surface of the prechamber cap. The openings 296 do not, according to this example, extend through the thermal segment 280, which is made of a more susceptable material like a copper-based material. The openings 296 may be located on the vertical or side wall of the prechamber cap 290 (as shown), the bottom wall of the prechamber cap (assuming the insert segment is located there), a combination thereof, or according to any other combination known in the art. Furthermore, the openings 296 may be straight walled bores, conical or tapered bores, a combination thereof, or some other configuration known in the art. Following step 430, the thermally enhanced prechamber cap may be welded and/or otherwise joined to a shell of any suitable prechamber spark plug, including any of the spark plugs disclosed herein.

It should be appreciated that the various thermally enhanced prechamber cap embodiments described herein are not limited to the aforementioned manufacturing methods. Other methods, including ones with different combinations and/or sequences of steps, may be used to produce such prechamber caps.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A prechamber spark plug, comprising:
    a center electrode assembly having a center electrode;
    an insulator having an axial bore for at least partially accommodating the center electrode assembly;
    a shell having an axial bore for at least partially accommodating the insulator;
    a ground electrode opposing the center electrode across a spark gap; and
    a thermally enhanced prechamber cap forming a prechamber that at least partially surrounds the spark gap, wherein the thermally enhanced prechamber cap includes a main body, a thermally conductive core, and at least one opening that allows the prechamber to communicate with a main combustion chamber;
        the main body includes a plurality of layers that correspond to interior and exterior surfaces of the thermally enhanced prechamber cap; and
        the thermally conductive core is sandwiched between the plurality of layers of the main body and includes a layer with at least one thermal segment and at least one insert segment, wherein the thermal segment includes at least one cutout in which the insert segment is located, and the insert segment is arranged such that the opening in the thermally enhanced prechamber cap extends through the insert segment.

2. The prechamber spark plug of claim 1, wherein the thermally enhanced prechamber cap is dome-shaped, semispherical-shaped or semiovoid-shaped.

3. The prechamber spark plug of claim 1, wherein the thermally enhanced prechamber cap includes an end surface that is attached to an end surface of the shell, the end surfaces of both the thermally enhanced prechamber cap and the shell are angled or slanted annular surfaces that are welded together.

4. The prechamber spark plug of claim 1, wherein the thermally enhanced prechamber cap includes an end surface that is attached to an end surface of the shell, the end surfaces of both the thermally enhanced prechamber cap and the shell are flat annular surfaces that are welded together.

5. The prechamber spark plug of claim 1, wherein each of the plurality of layers of the main body is made from a nickel-based material.

6. The prechamber spark plug of claim 1, wherein the thermal segment is made from at least one of a copper-based material, an aluminum-based material, or a silver-based material.

7. The prechamber spark plug of claim 6, wherein the thermal segment is made from the copper-based material.

8. The prechamber spark plug of claim 1, wherein the thermally conductive core circumferentially extends within the main body and includes a first core end that is located at an end surface of the thermally enhanced prechamber cap.

9. The prechamber spark plug of claim 8, wherein the first core end is exposed at the end surface so that the thermal segment physically contacts an end surface of the shell when the thermally enhanced prechamber cap is attached to the shell.

10. The prechamber spark plug of claim 1, wherein the insert segment is arranged in the cutout of the thermal segment so that passage surfaces in the thermally enhanced prechamber cap that define the opening are made from a material of the insert segment and not a material of the thermal segment.

11. The prechamber spark plug of claim 1, wherein the thermally conductive core is shifted within the main body so that a distance $A_1$ is less than or greater than a distance $A_2$, where $A_1$ is a distance from an inner side of the conductive core to the interior surface of the main body, and $A_2$ is a distance from an outer side of the conductive core to the exterior surface of the main body.

12. The prechamber spark plug of claim 11, wherein the dimension $A_1$ is in a range from 0.1 mm to 0.5 mm, inclusive, and the dimension $A_2$ is in a range from 0.1 mm to 0.5 mm, inclusive.

13. The prechamber spark plug of claim 1, wherein the thermally enhanced prechamber cap is made from a multi-piece assembly that includes a roll clad strip with a first layer, a second layer, and a third layer, the second layer is sandwiched between the first and third layers and includes the insert segment and the thermal segment;
    when the multi-piece assembly is formed into the thermally enhanced prechamber cap, the first and third layers are formed into the main body and the second layer is formed into the thermally conductive core.

14. The prechamber spark plug of claim 13, wherein the insert segment of the second layer is provided in the shape of a circle or an oval and the thermal segment of the second layer is provided in the shape of a ring or annulus, and the thermal segment surrounds the insert segment.

15. The prechamber spark plug of claim 13, wherein the insert segment of the second layer is one of a plurality of insert segments and the thermal segment of the second layer is provided with a plurality of cutouts in its interior, and the thermal segment surrounds the plurality of insert segments.

16. The prechamber spark plug of claim 1, wherein the thermally enhanced prechamber cap is made from a multi-piece assembly that includes a first preformed cup, a second preformed cup or sleeve, and a third preformed cup, the second preformed cup or sleeve is sandwiched between the first and third preformed cups and includes the at least one insert segment and the at least one thermal segment;
    when the multi-piece assembly is formed into the thermally enhanced prechamber cap, the first and third preformed cups are formed into the plurality of layers of the main body and the second preformed cup or sleeve is formed into the thermally conductive core.

17. The prechamber spark plug of claim 16, wherein the at least one insert segment of the second preformed cup or sleeve is provided as an elongated insert and the at least one thermal segment of the second preformed cup or sleeve is provided with at least one open-ended cutout for receiving the elongated insert so that the thermal segment only partially surrounds the insert segment.

18. A method for manufacturing a thermally enhanced prechamber cap for a prechamber spark plug, the method comprising the steps of:
    providing a multi-piece assembly that includes a main body piece and a thermally conductive core piece;
    forming the multi-piece assembly into the thermally enhanced prechamber cap, wherein the main body piece is formed into a main body and the thermally conductive core piece is formed into a thermally conductive core,
        the main body includes a plurality of layers that correspond to interior and exterior surfaces of the thermally enhanced prechamber cap;
        the thermally conductive core is sandwiched between the plurality of layers of the main body and includes a layer with at least one thermal segment and at least one insert segment, wherein the thermal segment includes at least one cutout in which the insert segment is located; and
    forming at least one opening in the thermally enhanced prechamber cap so as to allow for communication between a prechamber and a main combustion chamber, wherein the insert segment is aligned with the opening such that the opening extends through the insert segment.

* * * * *